Dec. 9, 1930.  R. R. ROBERTS  1,783,981
LUBRICATING METHOD AND APPARATUS
Filed March 30, 1929   2 Sheets-Sheet 1

Inventor
Ralph R. Roberts
by Parker & Brocknow
Attorneys

Dec. 9, 1930.    R. R. ROBERTS    1,783,981
LUBRICATING METHOD AND APPARATUS
Filed March 30, 1929    2 Sheets-Sheet 2
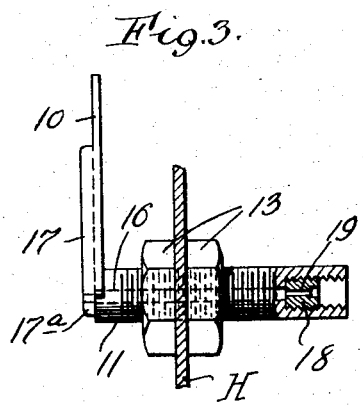
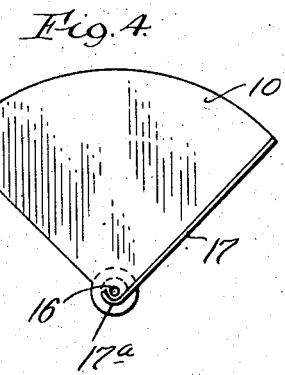
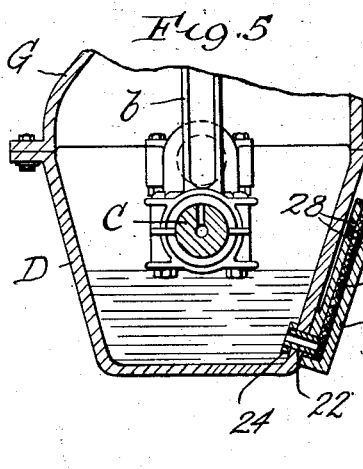
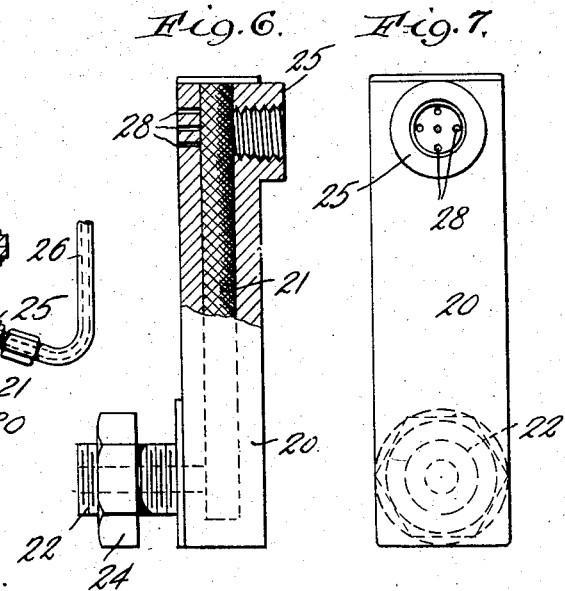
Inventor
Ralph R. Roberts
by Parker & Brocknow
Attorneys Patented Dec. 9, 1930

1,783,981

UNITED STATES PATENT OFFICE

RALPH R. ROBERTS, OF LOCKPORT, NEW YORK

LUBRICATING METHOD AND APPARATUS

Application filed March 30, 1929. Serial No. 351,261.

This invention relates to improvements in means for lubricating the top cylinder surfaces and valve stems of internal combustion engines.

Heretofore, these parts of internal combustion engines have been lubricated by means of special lubricants supplied from containers in small quantities to the intake manifolds of the engines, so that the flow of the combustible mixture from the intake manifold past the valves and to the upper ends of the cylinders will carry the lubricant to these parts. I have found that a better lubrication of these parts can be obtained by using a heavier oil, for example, the same oil that is used in the crank case of the engine for general lubrication of the engine.

The objects of this invention are to provide means whereby small quantities of the crank case oil or lubricant may be conducted directly to the intake manifold of the engine by the suction produced in the manifold; also to provide means whereby the quantity of such lubricant can be controlled as may be desired; also to improve the construction of lubricating means of this kind in other respects hereinafter specified.

In the accompanying drawings:

Fig. 3 is a fragmentary sectional elevation on an enlarged scale on line 3—3, Fig. 2, showing the lubricant collecting part of the lubricating means;

Fig. 4 is a side view of the part of the device illustrated in Fig. 3;

Fig. 5 is a fragmentary transverse sectional elevation of the crank case of the engine showing a lubricant dispensing device of modified construction applied thereto;

Fig. 6 is an elevation, partly in section, on an enlarged scale of the lubricant dispensing device shown in Fig. 5; and Fig. 7 is a side view thereof.

Figure 1:
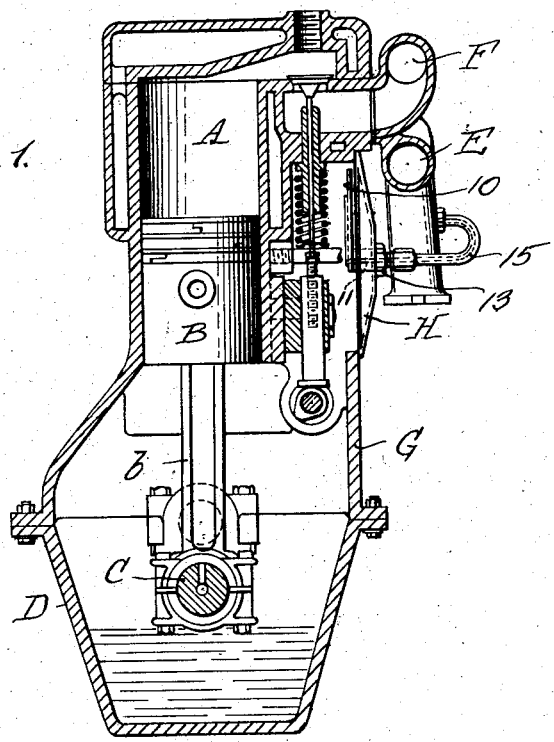
Fig. 1 is a transverse sectional elevation of an internal combustion engine.

The lubricating member embodied in my invention may be applied to any type of internal combustion engine, the engine shown in the drawings being for the purpose of illustrating how the invention may be applied to an engine, but it is not intended to restrict the invention in any way to the type of engine shown. This engine includes the usual cylinder block having the desired number of cylinders A in which pistons B reciprocate, the piston rods $b$ of which connect with a suitable crank shaft C. D represents the crank case of the engine which may be partly filled with lubricant and therefore acts as a reservoir or container for a supply of lubricant. The particular engine shown is lubricated partly by the splashing of the lubricant by the crank shaft and parts connected therewith. E represents the intake manifold of the engine, the carburetor connected therewith not being shown. During the operation of the engine, the interior of the intake manifold E is subjected to varying degrees of suction. F represents the exhaust manifold.

The engine block G in the particular construction shown is provided with a lower portion which fits over the top of the crank case D and is secured thereto. The lower portion of the engine block and the crank case therefore form a lubricant chamber, forming part of the lubricating system of the engine, in which chamber lubricant is contained and splashed to various parts of the engine. The engine block also has an opening in one side thereof which is closed by a plate H, which is removable to afford access to the valve stems and the actuating mechanism therefor. The lower portions of these valve stems and the valve actuating mechanism in the particular engine shown is lubricated by the splash of lubricant which enters into the part of the engine block closed by the plate H.

Figure 2:
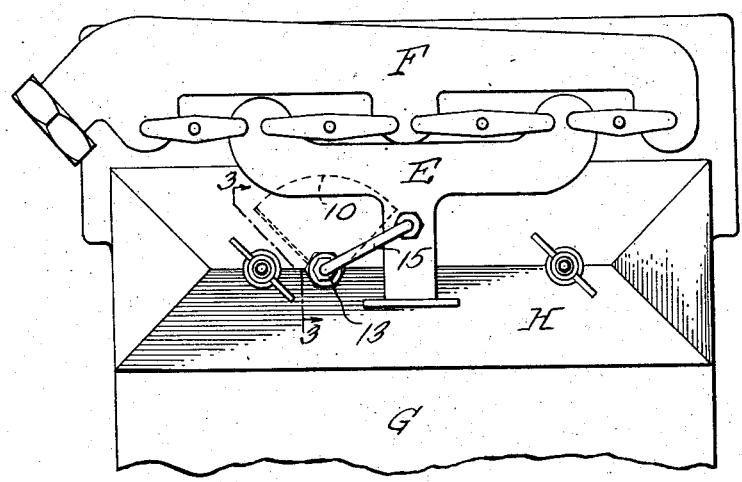
Fig. 2 is a side elevation thereof.

The particular embodiment of my invention shown in Figs. 1 to 4 includes means arranged near the valve actuating mechanism to collect a limited quantity of the lubricant splashed to this part of the engine. The lubricant controlling means in this construction include a collecting member mounted on the removable plate H, and this collecting member is in the form of a sector-shaped plate 10 having its lower end connected with a pipe or conduit 11 extending through the removable plate H, and this pipe is clamped to the removable plate H by means of nuts 13. The portion of the pipe or conduit 11 extending to the exterior of the plate H is connected by another pipe or tube 15 with the intake manifold E.

In order to guide the lubricant which splashes against a face of the sector-shaped plate 10 to the bore or opening 16 in the pipe 11, this plate is preferably provided at one of its radial edges with a flange or trough 17 which may be formed integral with the plate 10. The lower end of this flange extends into proximity in the opening 16 in the conduit 11 and is preferably provided with a curved part 17a which serves to guide lubricant into the bore 16. Consequently any lubricant which flows down along the flange or trough 17 is guided to the bore or opening 16 and is consequently drawn through the tubes 11 and 15 into the intake manifold E.

The lubricant receiving plate 10 may of course be of any suitable or desired form, that shown being adjustable with the tube 11 about the axis of the tube so that the plate 10 may occupy various angular relations. When the plate is arranged as shown in Fig. 4, it will be obvious that lubricant from only approximately one-half of the plate will pass downwardly along the flange 17 to the opening 16 and the tube 11.

If the lubricant receiving plate in this position does not supply sufficient lubricant to properly lubricate the upper ends of the cylinders and of the valve stems, the plate may be swung to the right so that larger portion of the plate is arranged vertically over the flange 17. Consequently, a larger quantity of lubricant will be delivered to the opening in the pipe 11. Similarly if a lesser quantity of lubricant is desired, the plate may be swung to the left of the position shown in Fig. 4 so that a small surface of the plate 10 lies vertically above the flange 17. When these lubricant controlling plates are applied to cars of a standard make, the adjustment of the plate about the axis is not necessary, since the plate may be initially set into a predetermined position which is known to provide the desired amount of lubricant.

In addition to controlling the supply of lubricant by adjusting the lubricant receiving plate 10 about the axis of the pipe 11, it may be desirable also to restrict the passage to the intake manifold. This may be done, as in the construction illustrated, by providing a restriction in the tube 11 in the form of a sleeve 18, the outer surface of which may be screw threaded to fit in a correspondingly internally threaded portion in the tube 11, and this sleeve has a jet opening 19 therein of the size desired to provide the necessary amount of lubrication to the intake manifold. The sleeve being readily removable, can be replaced by another sleeve having a different sized jet opening therein if a larger or smaller quantity of lubricant is required.

In the modified construction shown in Figs. 5 to 7, lubricant is taken directly from the crank case or from a suitable lubricant container. In order to prevent an excessive supply of lubricant passing to the intake manifold, the lubricant supply means are preferably constructed so that the lubricant must pass from the crank case or other source of lubrication to a wick.

In the construction shown for this purpose a wick containing tube or housing 20 is provided, which contains a wick 21. The lower end of this housing is provided with a lateral opening connecting with the bore of a tube or pipe 22, this pipe or tube passing through a hole in the crank case and being secured in place by means of nuts 24. This tube may be formed integral with the wick housing 20 or secured thereto and supplies crank case oil to the wick 21. At the upper end of the wick housing 20, a transverse pipe connection 25 is provided, to which a tube or conduit 26 may be secured, the upper end of that conduit connecting with the intake manifold on the engine. Opposite to the pipe connection 25, one or more small openings 28 are provided in the wick housing 20 through which air may pass transversely through the wick to the pipe connection 25. This air draws out of the upper end of the wick sufficient lubricant to supply the needs of the cylinder tops and valve stems. The quantity of lubricant supplied to the intake manifold may be controlled by controlling the number and size of the openings 28 or by providing a restriction or jet sleeve in the passage 26 similar to the sleeve 18 described in connection with the construction shown in Figs. 1 to 4.

The lubricating means disclosed have the advantage that in the first place they supply to the cylinder tops and valve stems a heavier grade of lubricant than has heretofore been supplied thereto, and which more effectively lubricate these parts of the engine. Furthermore, the lubricating means require no attention and no replenishing of the oil supply, since this is taken care of by maintaining the proper supply of lubricant in the crank case of the engine. The operation of the devices, therefore, is continuous and not dependent upon the attention of the operator of the engine. The device is comparatively inexpensive to apply to an engine and not being subject to wear, will last indefinitely.

I claim:

1. The combination with an internal combustion engine having an intake manifold and a lubricating chamber, of a part arranged in said chamber and subjected to the splash of lubricant, and a conduit connecting said intake manifold with said part in said chamber for drawing lubricant from said part into said intake manifold.

2. The combination with an internal combustion engine having an intake manifold and a splash lubricating system, of a part arranged within the engine and subjected to the splash of lubricant, and a conduit connecting said part and said intake manifold to withdraw from said lubricant splashed against the same.

3. The combination with an internal combustion engine having an intake manifold and a splash lubricating system, of a part arranged within the engine and subjected to the splash of lubricant, and a conduit connected with said intake manifold and extending into said engine and terminating at said part and adapted to withdraw from said part lubricant splashed against the same and to feed such lubricant to said intake manifold.

4. The combination with an internal combustion engine having an intake manifold and a splash lubricating system, of a plate mounted on said engine and subjected to the splash of lubricant, and a tube connecting said plate with said intake manifold to withdraw from said plate lubricant splashed against the same.

5. The combination with an internal combustion engine having an intake manifold and a splash lubricating system, of a plate mounted on said engine and subjected to the splash of lubricant, a tube connecting said plate with said intake manifold to withdraw from said plate lubricant splashed against the same, and means on said plate for guiding lubricant splashed against the same to said tube.

6. The combination with an internal combustion engine having an intake manifold and a splash lubricating system, of a plate mounted on said engine and subjected to the splash of lubricant, a tube connecting said plate with said intake manifold to withdraw from said plate lubricant splashed against the same, and means for holding said plate in various adjusted positions to vary the amount of lubrication passing to said tube.

7. The combination with an internal combustion engine having an intake manifold and a splash lubricating system, of a plate mounted on said engine and subjected to the splash of lubricant, a tube terminating at one end on said plate and at the other end in said intake manifold and secured to said plate, and means for securing said tube to said engine in different positions about the axis of the tube to vary the position of the plate for controlling the quantity of lubricant supplied to said tube.

8. The combination with an internal combustion engine having an intake manifold and a splash lubricating system, of a plate mounted on said engine and subjected to the splash of lubricant, a tube secured at one end to said plate and terminated at the other end in said intake manifold, means on said plate for guiding lubricant to said tube and means for angularly adjusting said plate to vary the quantity of lubricant supplied to said tube.

9. The combination with an internal combustion engine having an intake manifold and a splash lubricating system, of a plate mounted on said engine and subjected to the splash of lubricant, a tube secured at one end to said plate and terminating at its other end in said intake manifold, a flange on said plate for guiding lubricant splashed against said plate to said tube, and means for angularly adjusting said plate to vary the quantity of lubricant guided by said flange to said tube.

10. The combination with an internal combustion engine having an intake manifold and a splash lubricating system, of a plate subjected to the splash of lubricant, a tube connected on one end with said intake manifold and having said plate secured to the other end thereof, a substantially radial flange formed on said plate and extending into proximity to said tube for guiding lubricant splashed against the part of said plate vertically above said flange to said tube, and means for adjusting said plate about the axis of said tube to vary the quantity of lubricant carried by said flange to said tube.

RALPH R. ROBERTS.